E. FULDA.
ROCKING ELECTRODE.
APPLICATION FILED JAN. 20, 1916.
1,196,852.
Patented Sept. 5, 1916.
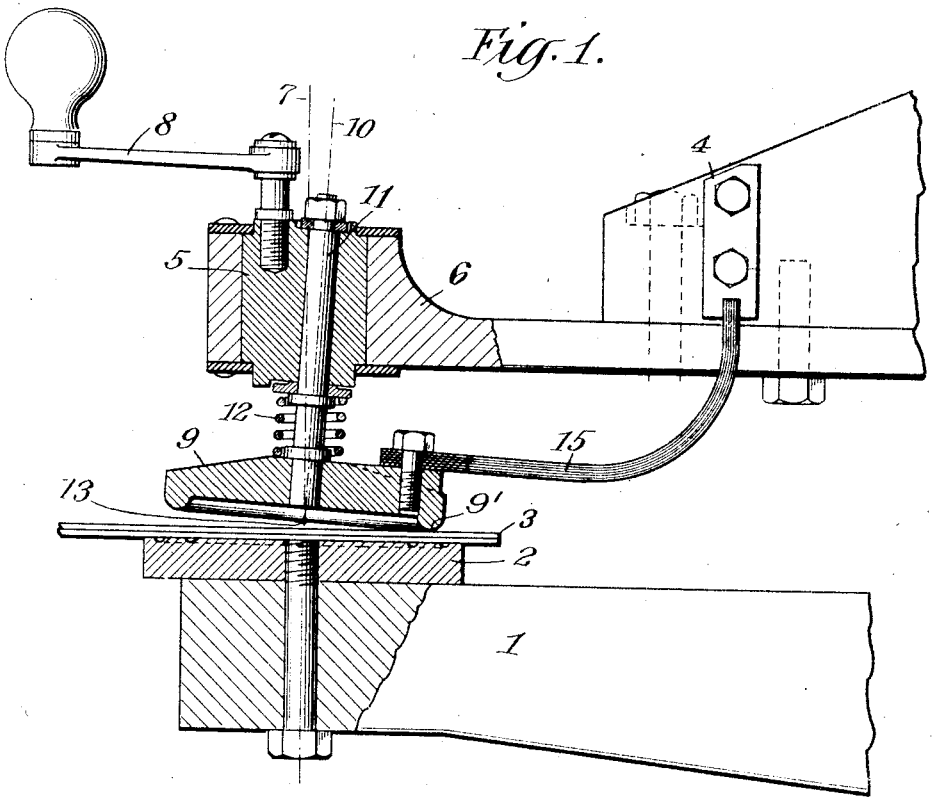
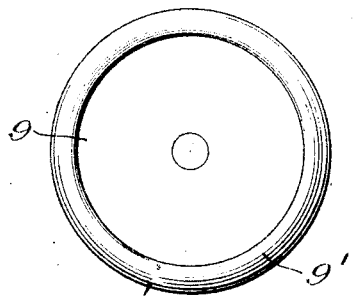
INVENTOR
Edward Fulda
BY
Townsend & Decker
ATTORNEYS

UNITED STATES PATENT OFFICE.

EDWARD FULDA, OF NEW YORK, N. Y.

ROCKING ELECTRODE.

1,196,852.  Specification of Letters Patent.  Patented Sept. 5, 1916.

Application filed January 20, 1916. Serial No. 73,112.

*To all whom it may concern:*

Be it known that I, EDWARD FULDA, a citizen of the United States, and a resident of New York, in the county of New York and State of New York, have invented certain new and useful Improvements in Rocking Electrodes, of which the following is a specification.

My invention relates to that class of electric welding machines in which the welding is produced by the action of an electrode pressed against the rear surface of the part to be welded as for instance in those welding operations wherein two sheets or plates of metal are to be welded together in their opposed surfaces.

The invention relates, more particularly stated, to machines designed to produce a circular welding or a weld forming a segment of a circle, that is to say, a weld in a curved line. In this class of machines as heretofore constructed the welding electrode is adapted to engage the whole line of the circular or curved weld at once by pressure applied at right angles to the surface of the weld and by making the electrode itself capable of an axial movement at right angles to said surface by any suitable means.

With this form of machine difficulty is experienced in making a good weld particularly when the line of weld describes a curve of large area owing to the fact that when the circle or curve is large the electrode is necessarily of such size that it will not seat equally or uniformly over all parts of the metal sheet where the weld is to be made or that on account of scale, dirt, &c., a uniform contact cannot be secured between the surfaces to be welded when it is attempted to apply the pressure to all points of the weld at once.

The object of my invention is to so construct the machine that a perfect weld can be produced at all points of the curve or circular line even though a large electrode be employed and to this end my invention consists in the novel construction whereby the electrode is given a rocking movement so that the weld is progressively formed one part at a time in much the same manner that it is formed by the use of a roller electrode employed as heretofore to make a straight line of weld or welds.

A construction whereby I secure this improved result is shown in the accompanying drawings in which:

Figure 1 shows one form of machine embodying my invention as to the essential parts in vertical central section, the remaining parts being shown in side elevation. Fig. 2 is a plan of the contact face of the electrode.

1 indicates the lower jaw or arm of an electric welding machine and 2 the copper or other contact block secured to the end of said arm and forming a rest or support for the work here typified as consisting of two plates or sheets of metal 3. 4 is the upper copper jaw or arm of the machine. Said jaws or arms are formed as usual in the art, the extremities of the secondary casting constituting the secondary of a transformer which supplies the heating current for the welding or other operation. As well understood in the art, said terminal jaws or arms 1, 4 might be connected to and supplied with current from any other desired source adapted to supply the requisite volume and proper voltage of current for the work being done.

5 is a rotary head consisting, if desired, of phosphor bronze or other suitable metal, mounted in and capable of rotation in an arm 6 or other suitable support. The axis of rotation of said head is substantially vertical to the plane of the work and is indicated by the dotted line 7. Said head may be rotated by a handle 8 or other suitable means. For convenience the arm or support 6 may be secured to the jaw 4 since this will furnish a support of proper rigidity although, as will be obvious, my invention is not limited to supporting the arm 6 by or attaching it to any particular part of the machine.

9 indicates a copper or other suitable welding electrode the circular or curved contact edge or surface of which that engages the work is indicated at 9'. Said electrode is mounted on the head 5 in such manner that its axis, indicated by the numeral 10, will be inclined to the axis 7 of rotation of the head 5. As the best method of mounting for the purpose of my invention I provide a stem 11 seated in the head or block 5 and capable of shifting its position by a turning movement on the line of its axis 10 and also capable, for the purpose of maintaining the contact of the electrode with the work, of an axial movement on the axis 10 under the influence of the spring or other suitable power indicated at 12. Spring 12 may be applied, as shown, between the bottom of the head 5 and the top of the electrode 9 while said electrode is itself suitably fastened to the lower end of the stem 11 as shown.

In order to produce the best effect of a rocking action, the axis 7 of rotation of the head 5 should preferably intersect or meet the line of the axis 10 in the plane of the contact face or edge 9' of the electrode as indicated at the point 13. By turning the head 5 the electrode 9 is caused to make a progressive contact with the surface of the work by a rocking action, the stem 11 being capable of turning in the head 5 to accommodate the action to the changing position of the said stem 11 around the center of rotation of the head 5. So far as the electrode 9 itself is concerned, the operation is in the nature of a purely rocking action of the contact edge or surface 9' upon the surface of the work, thus making a weld or series of welds in a curved line progressively instead of by a simultaneous action as is necessary where the electrode is reciprocated to and from the surface of the work.

Inasmuch as the action is a rocking action rather than a rolling action or contact produced by rotation of the electrode on its own axis, no rubbing contact connection between the stem and the source is necessary as in the use of rolling electrodes, and hence it is permissible to make direct connection between the stem and its source by the use of a flexible copper cable 15, as shown, permanently or fixedly secured at one end to the jaw 4 and at its other end to the electrode 9 itself.

What I claim as my invention is:—

1. In an electric welding machine, the combination of a rotary head and a circular electrode mounted thereon with its axis inclined to the axis of rotation of said head as and for the purpose described.

2. In an electric welding machine, the combination of a rotary head, a circular electrode mounted thereon with its axis inclined to the axis of rotation of said head and itself axially movable in said head and means for maintaining the contact of the electrode with the work during rotation of the head.

3. In an electric welding machine, the combination of a rotary head, a circular electrode secured to a stem mounted in said head with its axis inclined to the axis of rotation of the head and a spring operating on the electrode to maintain it in contact with the work.

4. In an electric welding machine, the combination with a rotary head, of a circular electrode, a stem to which the circular electrode is secured and having its longitudinal axis inclined to the axis of rotation of the head, said stem being capable of a turning and axial movement in the head as and for the purpose described.

5. In an electric welding machine, the combination substantially as described, of a rotary head adapted to rotate on an axis substantially vertical to the surface of the work, a rotary electrode mounted on said head with its axis inclined to the surface of the work and carried by a stem capable of turning on the head as well as being capable of axial movement thereon and a spring acting on said stem and electrode in the direction of the stem's axis to maintain the contact of the electrode with the work.

Signed at New York, in the county of New York and State of New York, this 18th day of January, A. D. 1916.

EDWARD FULDA.

Witnesses:
F. B. TOWNSEND,
REMINGTON SCOTT.

Copies of this patent may be obtained for five cents each, by addressing the "Commissioner of Patents, Washington, D. C."